Sept. 24, 1957     H. T. ROCKWELL     2,807,803
LUBRICATORS FOR JOURNAL BEARINGS
Filed Jan. 24, 1955     3 Sheets-Sheet 1
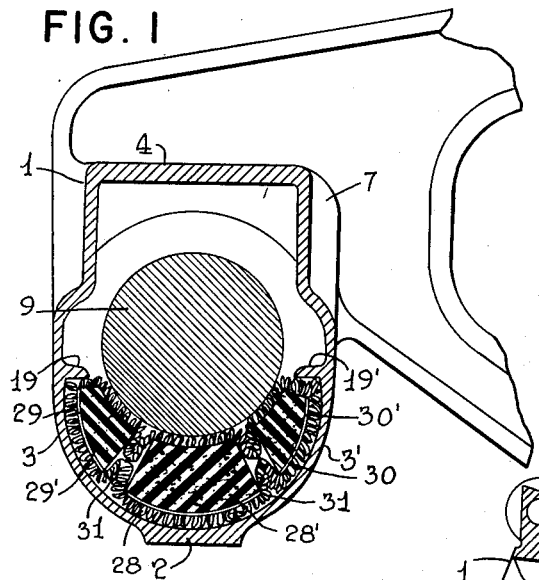
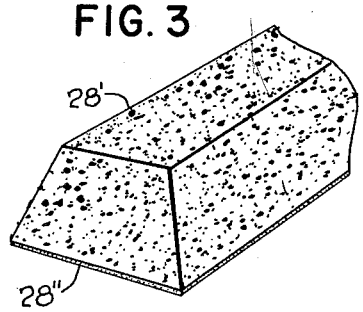
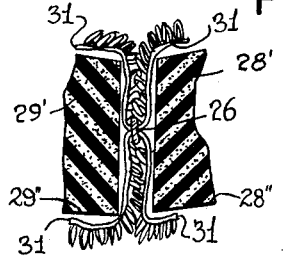
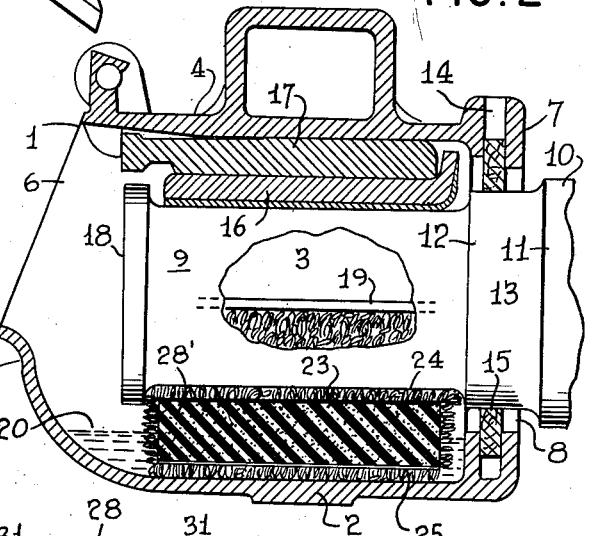
INVENTOR
HARLEY T. ROCKWELL
BY
ATTORNEY.

Sept. 24, 1957  H. T. ROCKWELL  2,807,803
LUBRICATORS FOR JOURNAL BEARINGS
Filed Jan. 24, 1955  3 Sheets-Sheet 2
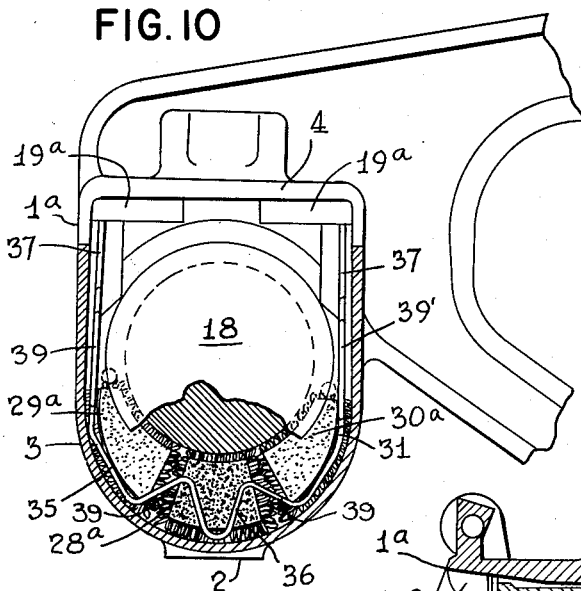
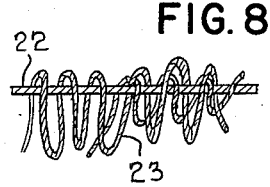
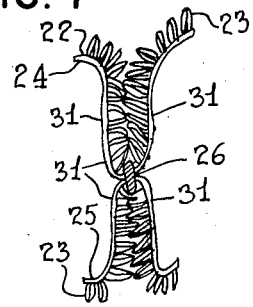
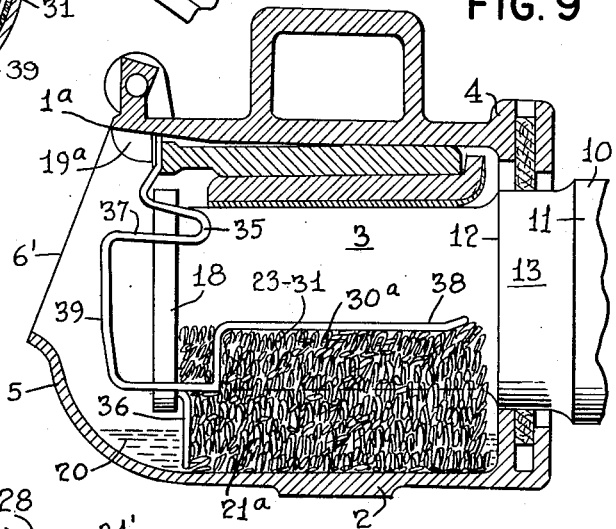
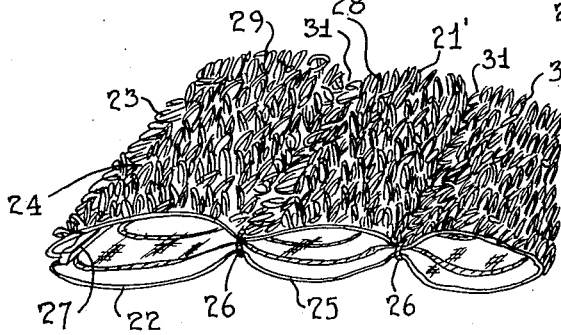
INVENTOR:
HARLEY T. ROCKWELL,
BY
ATTORNEY.

Sept. 24, 1957 H. T. ROCKWELL 2,807,803
LUBRICATORS FOR JOURNAL BEARINGS
Filed Jan. 24, 1955 3 Sheets-Sheet 3
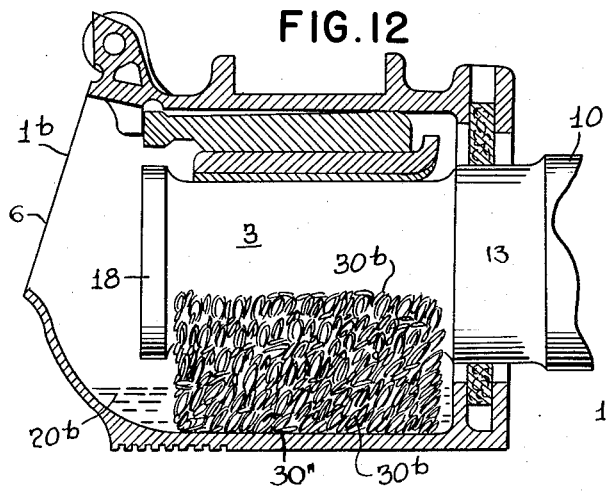
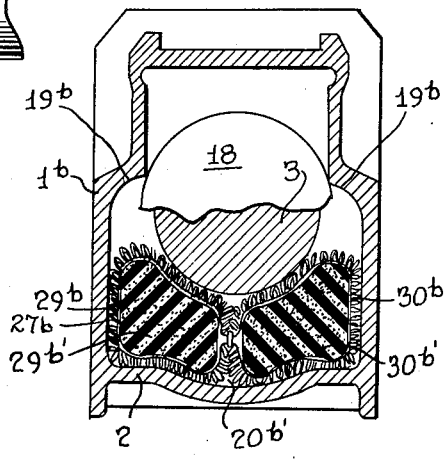
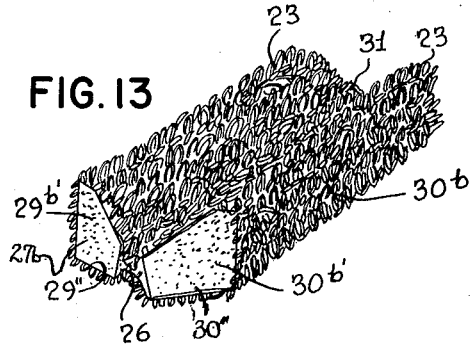
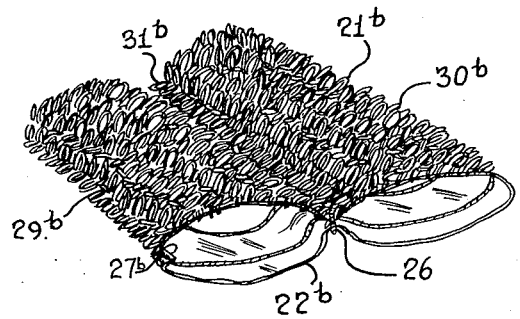
INVENTOR:
HARLEY T. ROCKWELL,
BY
ATTORNEY.

United States Patent Office 2,807,803
Patented Sept. 24, 1957

2,807,803

LUBRICATORS FOR JOURNAL BEARINGS

Harley T. Rockwell, Yonkers, N. Y.

Application January 24, 1955, Serial No. 483,641

5 Claims. (Cl. 308—243)

This invention relates to lubricators for journal bearings of railway car axle journals and other like journal bearings and particularly to lubricators of that type comprising an oil absorbing and transmitting or distributing elastic or resilient pad adapted to be disposed in the bottom of a journal box and held in contact with the surface of the journal and serve as a reservoir for lubricating oil and distributor for feeding such oil and oil stored in the box to the bearing surface of the journal.

The increases in the size and weight of cars equipped with such bearings, in the load weights carried thereby, and particularly in the speed of high speed trains, have resulted in a great increase in the number of what are known as "hot boxes" caused by the possibly and potentially dangerous over-heating of journal bearings due to inefficient and/or insufficient application of lubricating oil and other contributing causes inherent in the use of cotton waste and other types of lubricators commonly employed. The use of storage pad lubricators to secure higher efficiency and to overcome the other various defects of prior lubricators has been suggested, but, to the best of my knowledge and belief, none of these has been used to any extent or proved practically successful in service. The greater prevalence of hot boxes has also resulted in the development of many new devices for giving an alarm or signal when a hot box occurs, so that measures may be taken to stop the overheating of a journal before danger occurs, but these devices, however useful they may be for their intended purpose, are in the main subject to operation failures and do not meet the primary demand for adequate lubrication.

The main object of the present invention is to provide a pad type of lubricator which overcomes all the general objections to prior lubricators and which is responsive automatically to the demands of a journal in service to give more rapid and more efficient lubrication, sufficient at all times to keep the bearing in good running order and to prevent overheating of the bearing and the production of a hot box.

A further object of the present invention is to provide a novel and improved construction of lubricator, of pad type, which has such desirable qualities and which embodies a flexible expansible and retractible pad including resilient oil storage and cooperating absorbent oil storage and capillary oil feeding and distributing means forming component parts thereof, whereby a durable, inexpensive and reliable construction of lubricator is produced which in the forms disclosed or other equivalent forms is applicable to various types of journal boxes in use.

With these and other objects in view, which will appear in the course of the subjoined description, the invention consists of the novel construction, combination and arrangement of parts herein shown, described and claimed, and as shown in the accompanying drawings, in which:

Fig. 1 is a vertical transverse section through a journal box and journal, showing a lubricator of a type embodying my invention as applied for use therein.

Fig. 2 is a vertical longitudinal section through the box and lubricator with a portion of the journal broken away to show the stop rib or flange formed on the distal side of the journal box.

Fig. 3 is a fragmentary perspective view of one of the resilient oil storage bodies or cores.

Fig. 4 is a perspective view of the core filled pad as it appears in normal or compressed condition but with its portions arranged to show features of construction thereof.

Fig. 5 is a perspective view of the pad casing or jacket pe rse and as it appears when slack, as when the resilient cores are removed from its pockets.

Figs. 6 and 7 are enlarged detail sectional views through one of the oil containing joint connections between adjacent pockets of the casing or jacket showing, respectively, the connection as it normally appears and as it appears when the pad is applied to and held under compression in the journal box.

Fig. 8 is a detail sectional view through a portion of the pile or napped fabric casing or jacket.

Figs. 9 and 10 are views similar to Figs. 1 and 2 showing the application of the pad to a different form of journal box and held in the box against shifting by a retainer.

Figs. 11 and 12 are views generally similar to Figs. 1 and 2 and Figs. 9 and 10 showing still another form of journal box and a twin (2 pocket, 2 cartridge) form of pad for use in connection therewith.

Fig. 13 is a perspective view of the pad shown in Figs. 11 and 12 as it appears when removed from the journal box but charged with oil and ready for insertion into the journal box.

Fig. 14 is a perspective view of the casing shown in Fig. 13 as it appears when its pockets are not filled with cartridges.

Referring now more particularly to the form of the invention shown in Figs. 1–8, inclusive, 1 designates a journal box of a certain type which comprises in its construction a bottom wall 2, side walls 3, 3′, a top wall 4, a front wall 5 provided with a doorway or door opening 6, and a rear wall 7 having an opening 8 for passage of the journal 9 of the wheel carrying axle 10, which is formed at its rear end with the shoulder 11 and abutment 12 lying at the rear and front of the sealing surface 13 located at the juncture of the outer end of the axle and inner end of the journal. The surface 13 is disposed to rotate in the opening 8 and the wall 7 is provided with the usual well 14 to receive a sealing disk or gasket 15 which encircles and contacts with the surface 13 to close the opening 8 against the entrance to the journal box of dust and other foreign substances and the escape from the box of any undue amount of lubricating oil. The upper portion of the box, i. e., that portion between the wall portions 3, 3′ and the wall 4, is formed to provide a chamber to hold the journal bearing 16 and its retaining wedge 17 while the outer or forward end of the journal is formed or provided with the usual collar or flange 18 located in proximity to the door opening 6. This type of box has its wall portions 3, 3′ extending upwardly from the wall 2 convergently or on tapering lines to points located on opposite sides of the lower portion of the journal, at which points the side walls of the box are provided within cast stop ribs or flanges 19, 19′ to limit the upward movement of the lubricator pad. The box construction described provides at the base of the box below the journal a reservoir chamber for lubricating oil, as indicated at 20, and to receive the lubricating pad, which reservoir chamber is curved transversely of the box eccentrically with relation to the journal and is of greatest depth at its vertical center and thence tapers or converges toward the ribs or flanges 19, 19′.

The lubricator pad 21 is designed to fit in the reservoir chamber between the wall surfaces 2, 3, 3′ and ribs 19, 19′ about and in contact with said wall surfaces and ribs and the bottom and adjacent portions of the sides of the bearing surface of the journal between the abutment 12 and collar 18. This pad is of oblong rectangular form in plan and comprises an absorbent casing or jacket 22 preferably of a strong and durable permeable textile fabric having an outer loop-pile or napped surface 23, and which may be composed of one or more suitably connected pieces of the fabric. However, any other equivalent kind of material may be employed, and while, as stated, the casing may be made of a plurality of pieces of the material, I preferably employ a single-piece construction. In forming this single-piece pad construction, a piece of material of suitable length and width is selected, and this piece of material is folded upon itself with its pile surface outermost, to form relatively upper and lower wall portions 24, 25, which are stitched together at intermediate points transversely of the walls by longitudinally extending seams 26 and at one side where the end edges of the fabric are lapped by a longitudinally extending seam 27. This construction provides a casing or jacket having a central pocket 28 and side pockets 29, 30 which are open at each end and which when spread from a normally collapsed or slack condition are separated by intervening partition walls formed by V-shaped infolded tucks or pleats 31 united by the seams 26. These partition walls in the spread condition of the pockets are essentially double walls whose pile loops are overlapped, internested or commingled together and form with the fabric plies an oil conductor of large storage capacity and adapted to convey by capillary action a large volume of oil to the surface of the journal.

The pockets 28, 29 and 30 are designed to receive oil storage and feed core bodies or cartridges 28', 29', 30' of resilient material. Preferably these core bodies or cartridges are made of cellular resilient material such as sponge rubber, or sponge plastic, which are coextensive in length with the pockets and of cross-sectional dimensions to snugly fit the pockets and hold the same spread and to be placed under pressure to compress the pad and keep the pad in a state of compression with its surfaces pressed against the surface of the walls 3, 3', the flanges 19, 19' and the surface of the journal. The pores or cells of these resilient core bodies or cartridges are initially charged with oil and they take up oil conveyed thereto by the fabric container and expel the oil through the applying surfaces of the container to keep the ply loops saturated for a constant and complete lubricating action. It will be observed that the resilient bodies 28', 29', 30' are of polygonal form in cross-section, the body 28 being of quadrangular or frusto-pyramidal form and having horizontal top and bottom faces and straight upwardly inclined conveying side faces, while each body 29, 30 is of a quadrangular form having top, bottom and side faces at oblique angles to each other, the relatively inner and opposing side faces of the bodies 28', 29' and 30' being so related that when the pad is disposed in working position in the journal box the faces of the resilient bodies which lie oposite each other will be spaced and arranged substantially in parallel relation to each other to provide oil feed passages receiving the infolded partition walls 31, which passages extend from the bottom wall of the pad in contact with the bottom of the journal box upwardly to the top wall of the pad in contact with the surface of the journal. These passages provide short paths for flow of the oil from the box and resilient bodies to the journal in which the infolds 31 and their nested pile loops are more or less compactly disposed, whereby a rapid flow of oil in large volume to the journal by capillary attraction is ensured, supplemented by the pumping action induced by relative motion between the box and journal causing compression and expansion of the resilient bodies. The pad construction described also provides a flexible compressible and expansible pad which can be readily charged with oil for initial use, applied for use in charged condition, removed when required for repairs or cleaning of its casing with or without the removal of the resilient bodies from the pockets, or reversal of the pad to use either of its wall faces 24, 25 to contact with and supply oil to the journal, or to reverse the arrangement of the resilient bodies in their respective pockets from one side to the other side of the journal to make the lubricating action uniform in either direction of rotation of the journal. In practice the pad, before being put into the use, is placed in a pan or other suitable receptacle containing oil and compressed and allowed to expand to take up oil until the container is fully saturated and the resilient cores are charged with oil. The pad is then introduced into the box through the doorway and beneath the journal collar into the reservoir chamber of the box and forced under pressure into the chamber until it contacts with the stop ribs and journal and is held under compression between the walls of the chamber, ribs and bottom and sides of the journal. In thus introducing the pad the flexibility of the pad and resiliency of its cores adapts it to assume the transversely curved forms shown in Figs. 1 and 2 and to be placed under compression so that it will perform its feed functions in the manner described. In practice I prefer to make the resilient bodies 28', 29' and 30' of durable but relatively soft sponge rubber or sponge plastic, sufficiently soft to adapt the pad when applied to readily assume a curved form to fit the surface of the journal and the lubrication chamber when under compression, while offering enough resistance to compression to properly support the pad to sustain the load weight.

To stiffen the cores 28', 29' and 30' against lateral compression the bases of the cores may be provided each with a stiffening layer 28'', 29'' and 30'', which may be in the form of a skin surface molded with the core or as a part of a longer resilient body from which the core is made, to stiffen the cores against lateral extension and adapt them to resist jamming due to pressures tending to cause the pad to shift transversely of the box under static and kinetic friction coefficients of force at sudden changes of speed of the journal or due to inertia when rotated in one direction or the other from a state of rest. The box and pad will contain a sufficient amount of oil for long service use, but the supply of oil in the box may be replenished from time to time, and this oil will be taken up to keep the pad replenished and distributed by the pad to the journal.

The construction shown in Figs. 1 to 8 is well adapted for use in all types of journal boxes for the lubrication of all sizes of journal bearings and journals, but in practice specifically different forms of pads embodying the principles of the invention may be provided for special applications or for use in old and new types of journal boxes and bearings.

Figs. 9 and 10 show a construction of journal box 1$^a$ in which the box and pad are designed for the use of a spring type retainer to hold the pad under compression and against shifting in the box. The pad 21$^a$ here is or may be of the same general construction as that shown in Figs. 1 to 8, inclusive, in having core receiving pockets 28$^a$, 29$^a$, 30$^a$, and varying therefrom in conformation or not according to the form of the box. The box 1$^a$ is one having a base portion similar to the box 1 but is devoid of the flanges 19, 19' on its side walls to hold the pad under compression and prevent it from shifting. It is, however, provided on its top wall at the level of the top of the doorway 6' with stop lugs or abutments 19$^a$ for cooperation with a spring retainer 35 to hold the pad compressed and against shifting. This retainer may be one of several types available for use and which will serve the purpose, but that shown is formed of spring wire and comprises a generally U-shaped bracket or base portion 36 to extend transversely of the journal box and rest upon the bottom wall of the box and which carries at each side an upstanding retaining arm 36 and holding arm 37 and a horizontal forwardly extending clamping arm 38. The arms 37 are designed to bear at their lower ends against the lower portions of the side walls of the box and to bear at their upper free ends against the lugs 19ᵃ to hold the retainer under its spring force in retaining position, while the arms 38 project inwardly toward the rear of the box along the sides of the journal and bear upon the adjacent portions of the pockets 29ᵃ, 30ᵃ to limit the upward movement of the pad and hold the same under compression in the oil reservoir chamber of the box. The base 36 and arms 37 are provided with bent spring portions 39 and the arms 37 are further provided with bent portions 39 serving as hand grips whereby the retainer may be inserted into and withdrawn from the journal box and employed to assist the operator to insert the pad in place. A retainer of this or any other suitable type may be used to hold a pad in position in a journal box where the box is provided with abutments, such as 19ᵃ, or their equivalent, to hold the retainer in place.

In Figs. 11 to 14, inclusive, is shown a form of the invention in which a two-sectioned lubricator pad 21ᵇ comprising a casing 22ᵇ with twin pockets 29ᵇ, 30ᵇ to enclose resilient bodies or cores 29ᵇ′, 30ᵇ′, and having the features of construction previously described, is provided for use in a journal box 1ᵇ having a base lubricating chamber 20ᵇ with a depression 20ᵇ′ and side walls which are vertically straight at their lower portions but have inturned upper contacting portions 19ᵇ whereby the pad may be held in compressed condition and against shifting in a journal box not provided with special means for the purpose. The pockets of the pad 21ᵇ have the same general features as those disclosed in Figs. 1 to 10, inclusive, but may vary to some extent therefrom in form or size, or both, to receive polygonal resilient cores 29ᵇ′, 30ᵇ′, of a cross-section suitable when compressed to hold the pad in such state and against shifting in the box from a centered position in which its upper surface conforms to the contour of the bottom and lower portions of the sides of the journal and is held under compression in contact therewith. The operation of this construction and arrangement of pads are the same as that of the pads shown in Figs. 1 to 10, inclusive.

From the foregoing description, taken in connection with the drawings, it will be apparent that in operation the lubricator will be held under compression in the journal box and in contact with the lower portion of the journal so that it cannot shift under friction of the rotating journal and will always be centered for action with relation to the journal, and that in its working section oil stored under pressure in the box and resilient cores will be constantly fed to the journal by capillary attraction supplemented by a pumping action produced by relative motion between the box and journal and resultant compression and reaction of the resilient cores. As the oil is applied to the journal in its rotation in either direction by a continuous absorbent soft pile surface formed by the upper wall of the applicator pad a uniformly effective application of the oil to the journal is obtained without the liability of damaging objections incidental to the use of cotton waste and the feed of the oil to the journal is made automatically responsive to meet the demands required by journal speed and load weight changes. As stated, the pad may be reversed face-to-face so that either of its broad faces or wall surfaces may be used as its applicator surface and the surfaces alternately used to extend its life service as long as its applicator surfaces remain in good condition, and the pad casing and cores may be readily cleaned to remove impurities therefrom without removing the cores from the jackets or independently if considered desirable. The pad is also reversible to cause the cores at different times or shopping periods to face in different directions of travel of the journal, i. e., or longitudinally of the car, to equalize variations in physical changes thereof due to different ranges of travel in opposite directions. The cores may be made of plastic foam or sponge rubber of any degree of durability and resiliency to suit, and they are so mounted that damaged cores may be removed and readily replaced by new cores whenever necessary. Furthermore, the invention provides a type of lubricating pad which may be economically furnished and used to reduce to a minimum liability of hot boxes and their ill effects.

It is to be understood that while the pad may be compressed and held compressed by hand when preliminarily charging it with oil and introducing it into a journal box, a special tool for this purpose may be used.

These and other advantages will, it is thought, be fully understood and appreciated by those versed in the art without a further and extended description.

While the construction of the lubricator as herein shown and described is preferred it is to be understood that the construction shown is merely exemplificative, and that changes in form, construction and mode of application in use may be varied, within the scope of the appended claims, without departing from the spirit of sacrificing any of the advantages of the invention.

Having thus described my invention, I claim:

1. A lubricator adapted to be disposed in a journal box between the journal and the floor of the box, said lubricator comprising a fabric casing having a napped surface forming a first intermediate pocket and forming adjoining and connected pockets one on each side of said first pocket, all of said pockets being parallel and disposable in said journal box parallel to the journal therein with said first pocket below the axis of the journal, and a resilient core in each pocket for forcing the fabric forming said pockets into contact with lower portions of the journal, and for forcing the fabric of the respective pockets adjoining the connections therebetween into parallel disposition from the floor of the journal box to the journal with the nap of the fabric of adjacent pockets intermingled to form spaced passages extending from the floor of the box to the journal when said lubricator is mounted in a journal box, one passage formed between adjacent pockets of said lubricator being disposable on one side of a vertical centerline through a journal in a journal box in which the lubricator is inserted and another passage being simultaneously disposable on the other side of said vertical centerline, said passages being spaced from the center of the journal box at the bottom of the lubricator to minimize feed of foreign matter, and being spaced from the vertical center line of the journal box at the top of the lubricator so that the passage on the side of the vertical journal centerline toward which the bottom of the journal moves as it rotates conducts lubricant to the journal adjacent the outermost line of contact between the journal and lubricator on that same side.

2. A lubricator as set out in claim 1 wherein said napped surface comprises loop pile.

3. A lubricator as set out in claim 1 wherein said fabric casing is formed of a single piece of fabric having spaced and parallel stitching therein forming said pockets.

4. A lubricator as set out in claim 1 wherein the core of elastic material enclosed in the first pocket is of a greater depth than the cores of elastic material enclosed in said adjoining pockets.

5. A lubricator as set out in claim 4 wherein said cores have a polygonal cross section.

References Cited in the file of this patent

UNITED STATES PATENTS

| 91,000 | Devlan | June 8, 1869 |
| 2,747,952 | Harkenrider | May 29, 1956 |

FOREIGN PATENTS

| 206,924 | Germany | May 3, 1908 |
| 262,318 | Germany | July 10, 1913 |